United States Patent
Wada

(10) Patent No.: US 6,765,585 B2
(45) Date of Patent: Jul. 20, 2004

(54) IMAGE DISPLAY SYSTEM, IMAGE PROCESSING METHOD, AND PROGRAM

(75) Inventor: Osamu Wada, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 179 days.

(21) Appl. No.: 09/987,170

(22) Filed: Nov. 13, 2001

(65) Prior Publication Data

US 2002/0057835 A1 May 16, 2002

(30) Foreign Application Priority Data

Nov. 13, 2000 (JP) ........................................ 2000-344822
Sep. 27, 2001 (JP) ........................................ 2001-296027

(51) Int. Cl.$^7$ ................................................ G09G 5/02
(52) U.S. Cl. ...................... 345/589; 345/590; 345/591; 345/603; 345/604; 345/644; 382/162; 358/518; 348/602
(58) Field of Search ................................ 345/590, 591, 345/603, 604, 644; 348/602

(56) References Cited

U.S. PATENT DOCUMENTS

| | | | | |
|---|---|---|---|---|
| 5,300,944 A | * | 4/1994 | Shapiro et al. | 345/88 |
| 5,754,184 A | * | 5/1998 | Ring et al. | 345/604 |
| 6,118,455 A | * | 9/2000 | Hidaka et al. | 345/589 |
| 6,320,980 B1 | * | 11/2001 | Hidaka | 382/167 |
| 6,437,792 B1 | * | 8/2002 | Ito et al. | 345/600 |
| 6,560,356 B1 | * | 5/2003 | Takahashi et al. | 382/162 |

FOREIGN PATENT DOCUMENTS

| | | |
|---|---|---|
| EP | 1 079 605 A2 | 2/2001 |
| JP | A 4-25892 | 1/1992 |
| JP | A 4-53374 | 2/1992 |
| JP | A 5-236371 | 9/1993 |
| JP | A 8-292752 | 11/1996 |
| JP | 9-98301 | 4/1997 |
| JP | A 9-98301 | 4/1997 |
| JP | 11-075072 | 3/1999 |
| JP | A 11-231282 | 8/1999 |
| JP | 11-316566 | 11/1999 |

* cited by examiner

*Primary Examiner*—Matthew C. Bella
*Assistant Examiner*—Antonio Caschera
(74) *Attorney, Agent, or Firm*—Oliff & Berridge, PLC

(57) ABSTRACT

An image display system, image processing method, and program that make it possible to reproduce the colors of an image more rapidly in accordance with the user's preferences. The image display system includes: a color gamut calculation section that calculates a target color gamut based on a target profile within a target profile storage section that was selected by the user, and also calculates a displayable color gamut based on a projector profile within a projector profile storage section and environmental information from a colored-light sensor that detects the visual environment; a matrix generation section that generates a conversion matrix according to the relationship between the target color gamut and the displayable color gamut; and a matrix converter section that uses the thus-generated conversion matrix to convert image information; whereby image information is converted and image is displayed.

9 Claims, 7 Drawing Sheets

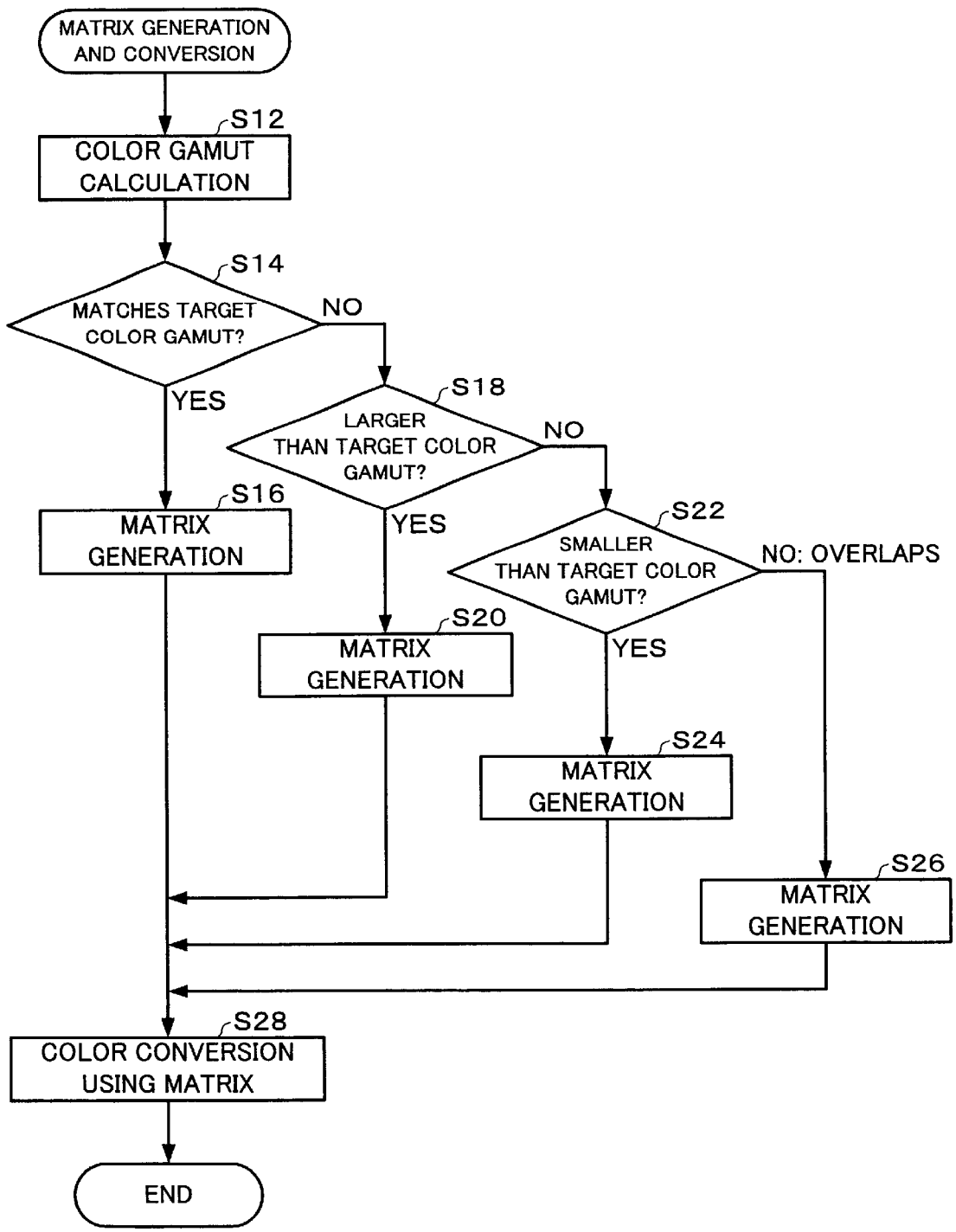

IMAGE DISPLAY SYSTEM, IMAGE PROCESSING METHOD, AND PROGRAM

Japanese Patent No. 2000-344822, filed on Nov. 13, 2000, and Japanese Patent No. 2000-296027, filed on Sep. 27, 2001, are herein incorporated by reference in their entirety.

BACKGROUND OF THE INVENTION

1. Field of the Invention

The present invention relates to an image display system, image processing method, and program.

2. Description of Related Art

Various color conversion systems such as the color management system (CMS) have been proposed in order to provide uniformity in an image view.

However, the desired image view can differ, depending on individuals and location.

As one example, the standardized method for displaying images in Japan is NTSC, whereas one of the standardized methods for displaying images in Europe is PAL.

A situation that can therefore arise in which an image that was generated on the assumption that it would be viewed as NTSC in Japan is displayed in Europe to Europeans, giving rise to a difference in which the image is viewed, from consideration of the preferences of Europeans.

For that reason, it is not sufficient merely to convert the image information (such as the RGB signals), but it is necessary to convert the image information in accordance with an image characteristic such as the display method selected by the user.

Since an image view is also affected by factors such as ambient light, it is also necessary to detect the visual environment and take that visual environment into consideration when converting the image information.

During the conversion of image information in accordance with the image characteristic and the visual environment, the information used for the conversion must be generated. However, storing conversion information for all assumed image characteristics and visual environments beforehand in a storage region places pressures upon that storage region.

In addition, image information that is generated in real time must be converted in real time.

SUMMARY OF THE INVENTION

The present invention was devised in the light of the above-described technical problems and has as an objective thereof the provision of an image display system, image processing method, and program that enable faster reproduction of an optimal image view in accordance with an image characteristic selected by a user.

(1) In order to solve the above described technical problems, according to a first aspect of the present invention, there is provided an image display system which converts image information used for displaying an image and displays the image, based on environmental information obtained by a visual environment detection means which detects visual environment in a display area in which the image is displayed; the image display system comprising:

matrix generation means which generates a conversion matrix used for conversion, based on the environmental information and an image characteristic selected by a user, so as to display the image that is suited to the visual environment and the image characteristic;

matrix conversion means which converts the image information, based on the generated conversion matrix; and image display means which displays the image based on the converted image information;

wherein the image characteristic is based on at least one of an image display method and an image classification.

(2) According to a second aspect of the present invention, there is provided an image display system which converts image information used for displaying an image and displays the image, based on environmental information obtained by a visual environment detection section which detects visual environment in a display area in which the image is displayed; the image display system comprising:

a matrix generation section which generates a conversion matrix used for conversion, based on the environmental information and an image characteristic selected by a user, so as to display the image that is suited to the visual environment and the image characteristic;

a matrix conversion section which converts the image information, based on the generated conversion matrix; and an image display section which displays the image based on the converted image information;

wherein the image characteristic is based on at least one of an image display method and an image classification.

(3) According to a third aspect of the present invention, there is provided a computer-readable program for converting image information used for displaying an image, based on environmental information obtained by a visual environment detection means which detects visual environment in a display area in which the image is displayed, the program causing a computer to function as:

matrix generation means which generates a conversion matrix used for conversion, based on the environmental information and an image characteristic selected by a user, so as to display the image that is suited to the visual environment and the image characteristic; and matrix conversion means which converts the image information, based on the generated conversion matrix; and wherein the image characteristic is based on at least one of an image display method and an image classification.

(4) According to a fourth aspect of the present invention, there is provided an image processing method which converts image information used for displaying an image, based on environmental information obtained by a visual environment detection means which detects visual environment in a display area in which the image is displayed, the image processing method comprising:

a matrix generation step of generating a conversion matrix used for conversion, based on the environmental information and an image characteristic selected by a user, so as to display the image that is suited to the visual environment and the image characteristic; and a matrix conversion step of converting the image information, based on the generated conversion matrix.

The present invention enables conversions that are faster than a case in which a look-up table (hereinafter abbreviated to LUT) is used as conversion information, by generating a conversion matrix for use as conversion information and using that conversion matrix in the conversion of the image information, which also enables a reduction in the dedicated space within a storage region.

It therefore becomes possible to display an image that conforms to the image characteristic selected by the user and the visual environment, in real time.

Note that the image display method in this case refers to a method such as NTSC, PAL, or SECAM. The image classification refers to a system such as RGB or sRGB.

(5) Each of the image display systems may further comprise:

a color gamut calculation means which calculates a target color gamut based on the image characteristic and also calculates a displayable color gamut that is displayable by the image display means in the visual environment, based on the environmental information;

wherein the matrix generation means may generate different conversion matrices according to a relationship between the displayable color gamut and the target gamut, the relationship including a case where the displayable color gamut is larger than the target color gamut, a case where the displayable color gamut is smaller than the target color gamut, a case where the displayable color gamut matches the target color gamut, and a case where the displayable color gamut has a portion that overlaps the target color gamut and a portion that does not overlap the target color gamut.

(6) The program may cause the computer to function as a color gamut calculation means which calculates a target color gamut based on the image characteristic and also calculates a displayable color gamut that is displayable by the image display means in the visual environment, based on the environmental information;

wherein the matrix generation means may generate different conversion matrices according to a relationship between the displayable color gamut and the target gamut, the relationship including a case where the displayable color gamut is larger than the target color gamut, a case where the displayable color gamut is smaller than the target color gamut, a case where the displayable color gamut matches the target color gamut, and a case where the displayable color gamut has a portion that overlaps the target color gamut and a portion that does not overlap the target color gamut.

(7) In the image processing method, the matrix generation step may include a step of calculating a target color gamut based on the image characteristic and also calculating a displayable color gamut that is displayable by the image display means in the visual environment, based on the environmental information; and the matrix generation step may generate different conversion matrices according to a relationship between the displayable color gamut and the target gamut, the relationship including a case where the displayable color gamut is larger than the target color gamut, a case where the displayable color gamut is smaller than the target color gamut, a case where the displayable color gamut matches the target color gamut, and a case where the displayable color gamut has a portion that overlaps the target color gamut and a portion that does not overlap the target color gamut.

The relationship between a color gamut based on an image characteristic and a color gamut that can be displayed by the image display means depends on the visual environment and the image characteristic. For that reason, it is not possible to reproduce an image appropriately by a method of converting image information that uses only a single conversion matrix.

The present invention makes it possible to reproduce an image more appropriately by dividing the relationships into the above described four patterns and generating a conversion matrix in correspondence to each of those patterns.

(8) In the image display systems and program, the matrix generation means may generate the conversion matrix that emphases either hue reproducibility or color gamut reproducibility, when the displayable color gamut is smaller than the target color gamut or when the displayable color gamut has a portion that overlaps the target color gamut and a portion that does not overlap the target color gamut.

(9) In the image processing method, the matrix generation step may generate the conversion matrix that emphases either hue reproducibility or color gamut reproducibility, when the displayable color gamut is smaller than the target color gamut or when the displayable color gamut has a portion that overlaps the target color gamut and a portion that does not overlap the target color gamut.

This makes it possible to reproduce an image more appropriately, by generating a conversion matrix that emphasizes either hue reproducibility or color gamut reproducibility.

(10) Each of the image display systems may further comprise a projection-type display device having:

the color gamut calculation means;

the matrix generation means;

the matrix conversion means;

the image display means; and calibration image generation means which generates a calibration image;

wherein the image display means may project the generated calibration image for display on the display area; and wherein the visual environment detection means may detect the visual environment in the display area in which the calibration image is displayed.

Since this enables generation of a calibration image within the projection-type display device, it makes it possible for the projection-type display device itself to perform calibration, without having to input a calibration image from an external input device such as a PC to the projection-type display device.

(11) The image processing method may further comprise the steps of:

generating a calibration image, prior to compensation of the image information;

displaying the generated calibration image in the display area; and detecting the visual environment within the display area in which the calibration image is displayed, and generating the environmental information.

This makes it possible to detect the visual environment more appropriately, by using a calibration image. It is therefore possible to reproduce the image view more appropriately.

BRIEF DESCRIPTION OF THE DRAWINGS

FIG. 7 is a flowchart of the procedure for matrix generation and conversion processing in accordance with one embodiment of the present invention.

DETAILED DESCRIPTION OF THE EMBODIMENTS

Embodiments of the present invention applied to an image display system that uses a liquid crystal projector are described below by way of example, with reference to the accompanying figures. Note that the embodiments described below do not limit the scope of the invention defined by the claims laid out herein. Similarly, the overall configuration of the embodiments below should not be taken as limiting the subject matter defined by the claims herein.

Overall System

Figure 1:
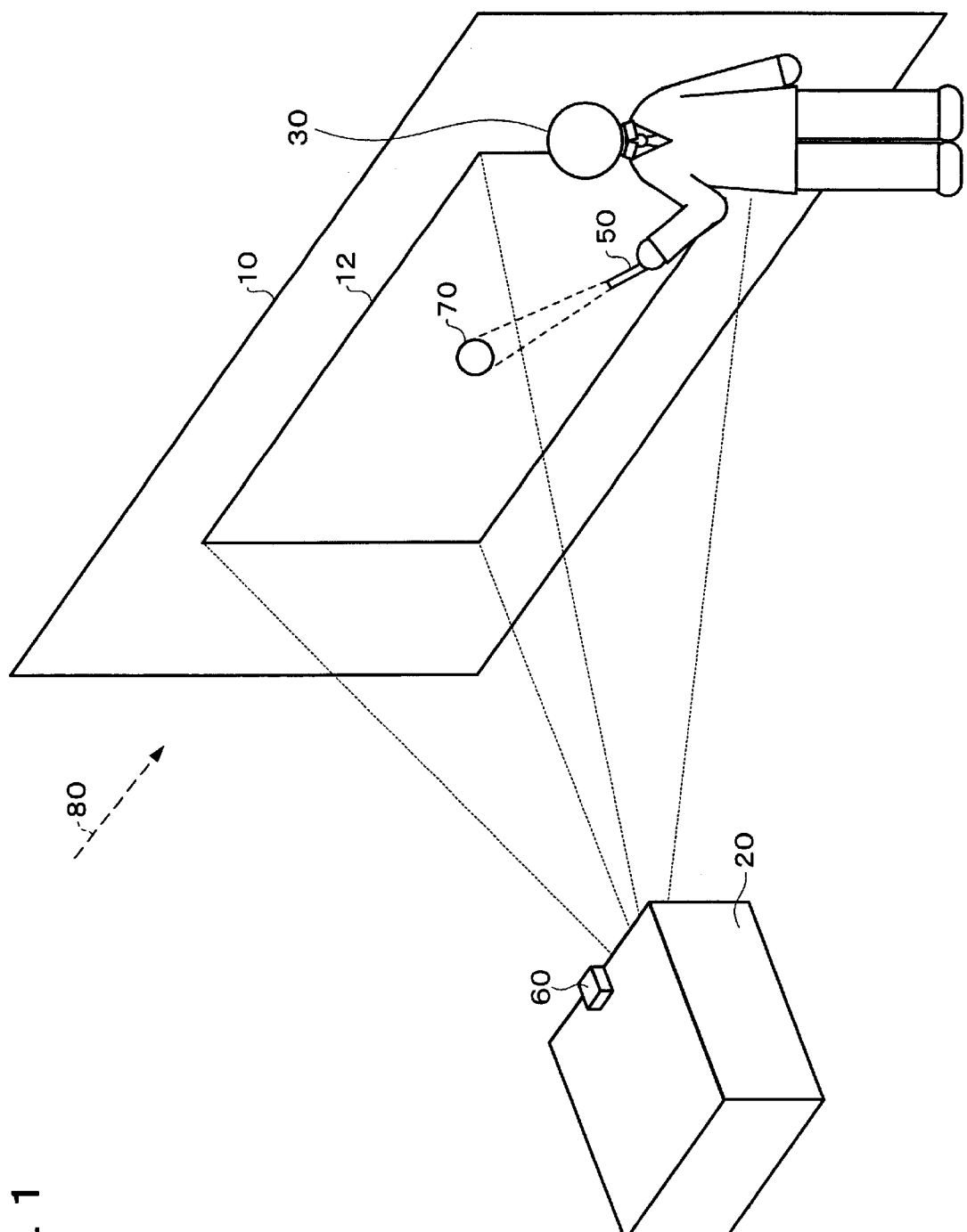
FIG. 1 is a schematic illustrative view of an image display system according to one embodiment of the present invention.

A schematic illustrative view of an image display system in accordance with one embodiment of the present invention is shown in FIG. 1.

A projector 20, which is one type of a projection-type display device provided substantially facing a screen 10, projects an image for a predetermined presentation. A presenter 30 gives a presentation to an audience, while using a light spot 70 projected from the laser pointer 50 to point at a desired position of an image in an image display region 12, which is a display-receiving area on the screen.

During such a presentation, the image view on the image display region 12 will vary greatly, depending on factors such as the type of the screen 10 and ambient light 80. When the same white is displayed, for example, the type of the screen 10 could make it seem to be white with a yellow cast or white with a blue cast. Similarly, differences in the ambient light 80 could make the same white appear to be a bright white or a dull white.

Recently, this projector 20 has become smaller and easy to transport. For that reason, it has become possible to perform presentations at a client's location, by way of example, but it is difficult to adjust colors to match the environment at the client's location and the manual adjustment of colors at the client's location takes too much time.

With a prior-art projector, color modification is based on an input-output profile that indicates input-output characteristics that are specific to that particular projector, so no consideration is paid to the visual environment in which the image is projected and displayed. Note that this "profile" means "characteristic data".

However, it is difficult to make the view of colors uniform in this manner, without taking the visual environment into account. The view of colors is determined by three factors: light, the reflection or transmission of light by objects, and vision.

This embodiment of the present invention implements an image display system that can reproduce appropriate colors, by detecting the visual environment of light and the reflection or transmission of light by objects.

If the objective is to reproduce colors appropriately, there may be differences in the appropriate colors, depending on the user or the location at which the colors are reproduced.

If the projector 20 is to be used in Japan, for example, it is considered that the user would want to reproduce the colors of the image in accordance with the NTSC method, whereas if the projector 20 is to be used in Europe, it is considered that the user might want to reproduce the colors of the image in accordance with the PAL method.

In such a situation, it is necessary for the user to reproduce the desired image colors, regardless of the location in which the projector 20 is used.

With this embodiment of the invention, the projector 20 is configured in such a manner that the colors of images can be adjusted on the basis of a selection of the user's image display method or the like.

More specifically, the device is provided with a colored-light sensor 60 that functions as visual environment detection means for detecting the visual environment, as shown in FIG. 1, and environmental information from the colored-light sensor 60 is input to the projector 20. The colored-light sensor 60 measures environmental information (more specifically, RGB or XYZ tristimulus values) within the image display region 12 of the screen 10.

The projector 20 is provided with a conversion means for generating a matrix used for conversion, based on selection information such as environmental information from the colored-light sensor 60 and the user's image display method, then using that conversion matrix for converting image information to be used for the image display.

An image display system that enables appropriate image color reproduction can be implemented by detecting the visual environment on the basis of environmental information and determining the user preferences from selection information.

In addition, this embodiment calculates the displayable color gamut that can be displayed by the projector 20 in the visual environment in which the presentation is given, and also uses an image display method selected by the user to calculate a target color gamut. Image processing is done by comparing the thus-obtained displayable color gamut and target color gamut, so that the colors that are as close as possible to the target color gamut can be displayed by the projector 20.

Color Gamuts

Figure 2A:
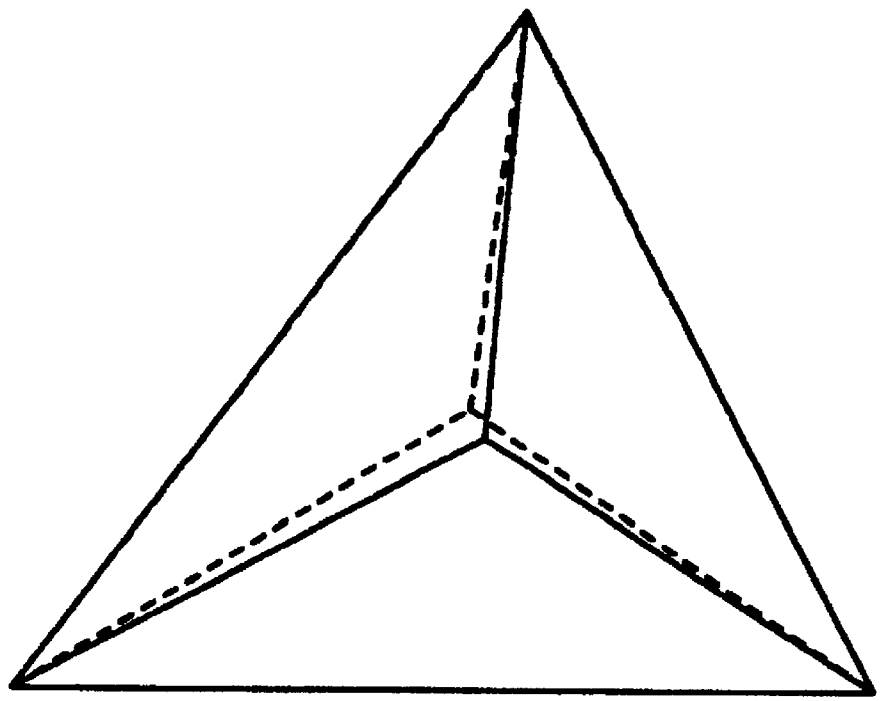
FIG. 2A is a schematic diagram of a target color gamut and a displayable color gamut when the target color gamut and the displayable color gamut match.
Figure 2B:
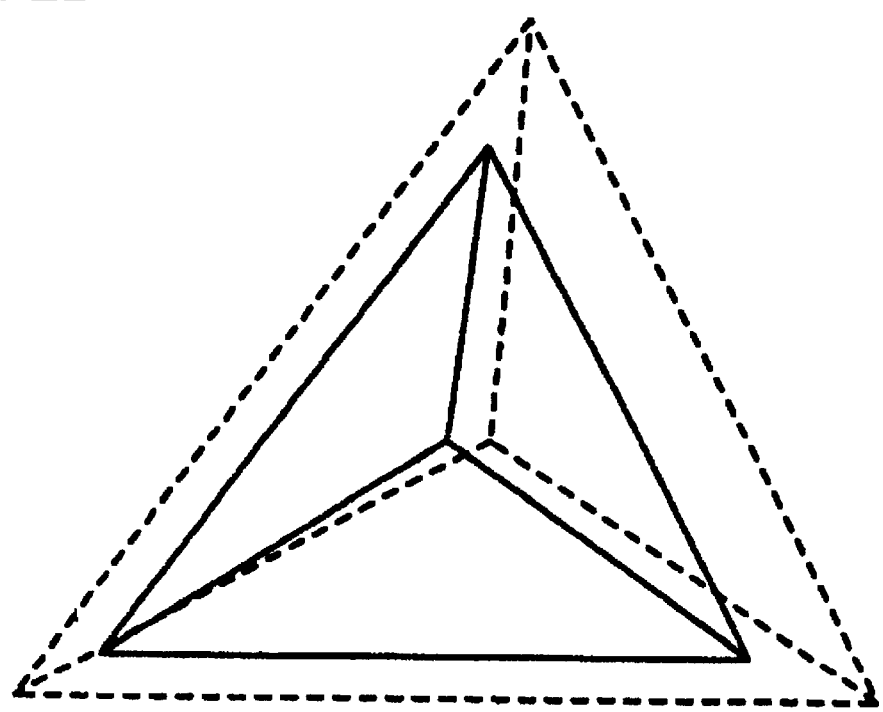
FIG. 2B is a schematic diagram of a target color gamut and a displayable color gamut when the displayable color gamut is larger than the target color gamut.
Figure 3A:
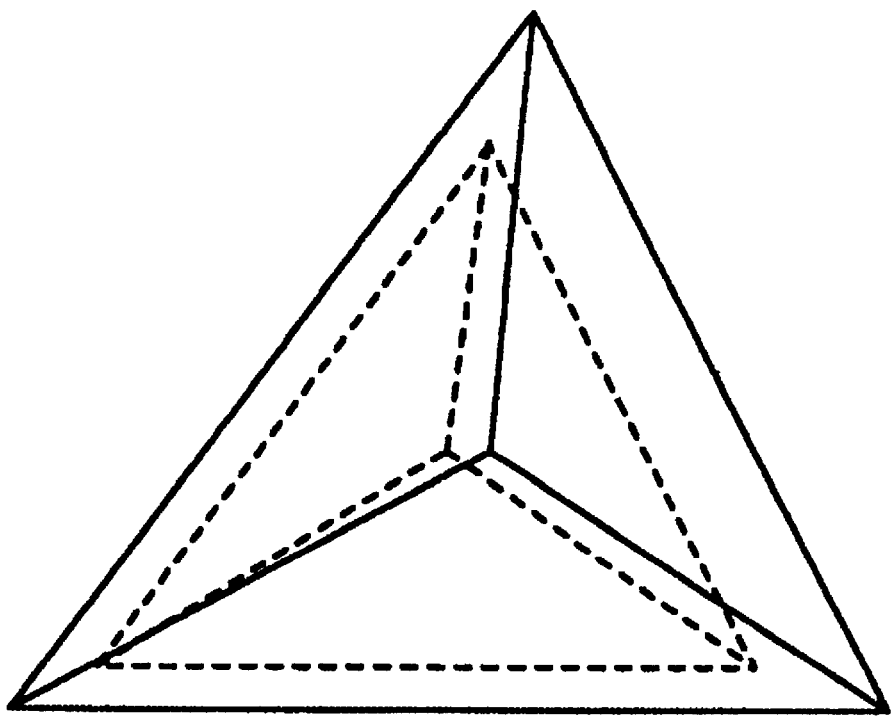
FIG. 3A is a schematic diagram of a target color gamut and a displayable color gamut when the displayable color gamut is smaller than the target color gamut.
Figure 3B:
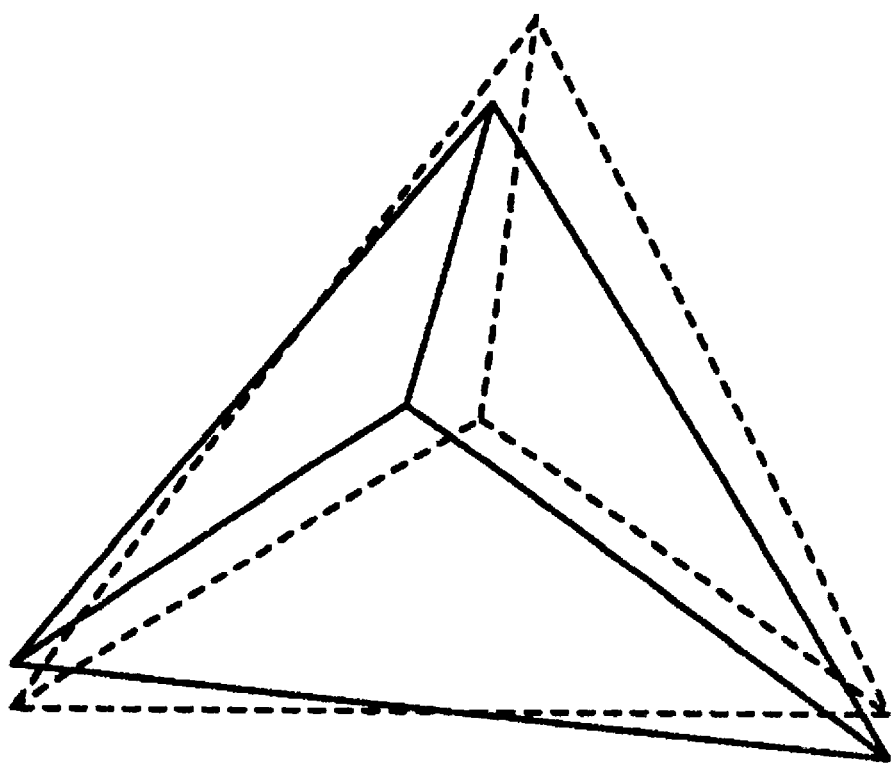
FIG. 3B is a schematic diagram of a target color gamut and a displayable color gamut when the target color gamut has a portion that overlaps the displayable color gamut and a portion that does not overlap the displayable color gamut.

A schematic diagram of a target color gamut and a displayable color gamut when the target color gamut and the displayable color gamut match is shown in FIG. 2A and a schematic diagram of a target color gamut and a displayable color gamut when the displayable color gamut is larger than the target color gamut is shown in FIG. 2B. Similarly, a schematic diagram of a target color gamut and a displayable color gamut when the displayable color gamut is smaller than the target color gamut is shown in FIG. 3A and a schematic diagram of a target color gamut and a displayable color gamut when the target color gamut has a portion that overlaps the displayable color gamut and a portion that does not overlap the displayable color gamut is shown in FIG. 3B.

In FIGS. 2A to 3B, the solid lines denote target color gamuts and the broken lines denote displayable color gamuts. In addition, the intersection of lines from each vertex of each triangular color gamut towards the central portion of the triangular shape is the white spot.

Note that the color gamuts in FIGS. 2A to 3B are defined in the plans as color coordinates (x, y). In this case, x=X/(X+Y+Z) and y=Y/(X+Y+Z). Each of X, Y, and Z is a stimulus value in the XYZ color display system.

Since there are two variable factors (the image characteristic and the visual environment), the relationship between the target color gamut and the displayable color gamut is not fixed. It can be broadly classified into the four patterns shown in FIGS. 2A to 3B.

The method of converting image information differs somewhat depending on which of these four patterns is appropriate. For example, if the displayable color gamut covers the whole of the target color gamut, as shown in FIGS. 2A and 2B, the target image can be reproduced appropriately by using an ordinary conversion method.

If, however, the displayable color gamut does not cover the entire target color gamut, as shown in FIGS. 3A and 3B, it will not be possible to reproduce the target image appropriately by using an ordinary conversion method.

In such a case, it is necessary to perform color gamut mapping (this could also be called color gamut compression) to allocate colors of the target color gamut that are outside the displayable color gamut to colors within the target color gamut.

This embodiment of the present invention uses either a method that places priority on color gamuts or a method that places priority on hues, as the color gamut mapping method.

Figure 4A:
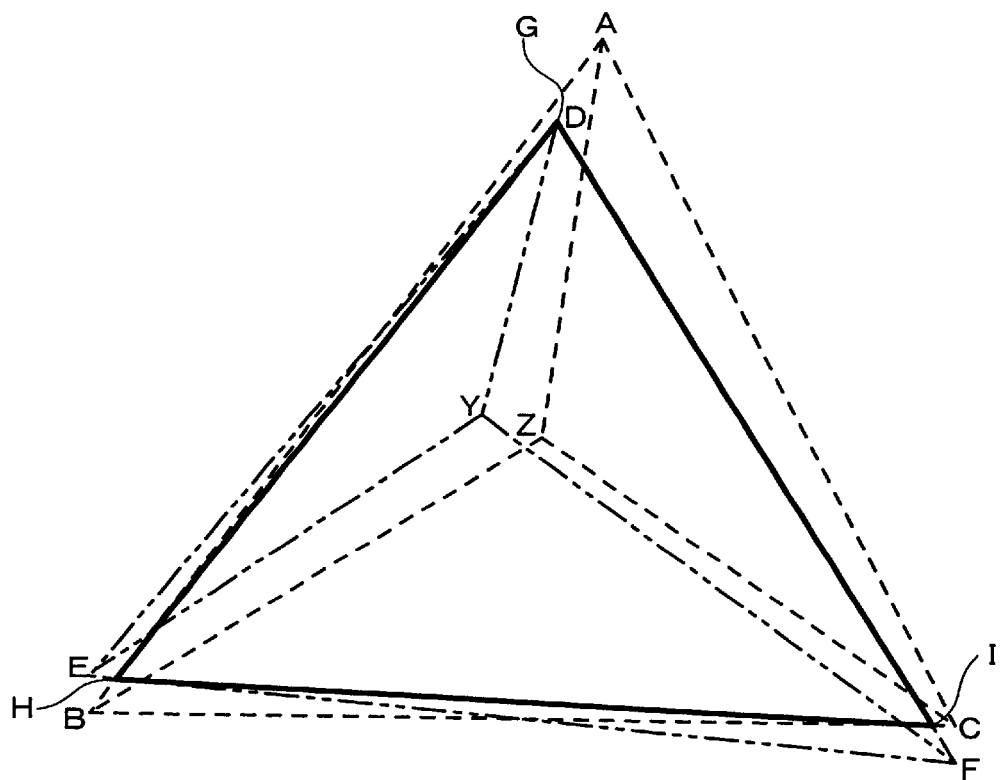
FIG. 4A is a schematic diagram of color gamuts after color gamut mapping that places priority on color gamuts and FIG. 4B is a schematic diagram of color gamuts after color gamut mapping that places priority on hues.
Figure 4B:
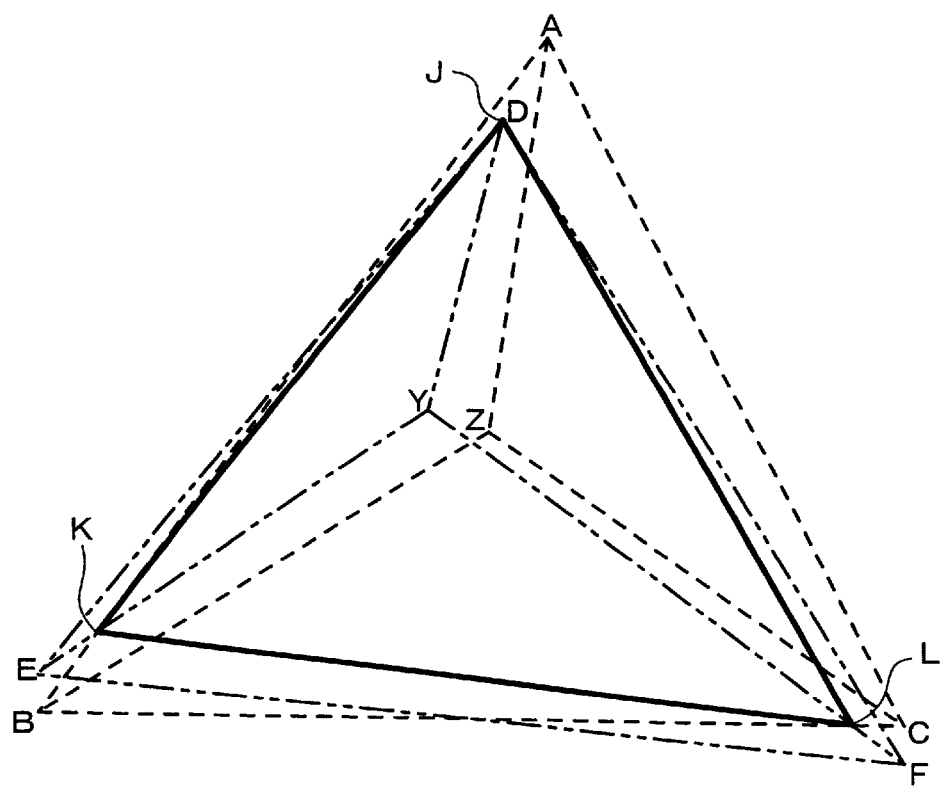

A schematic diagram of color gamuts (mapping color gamuts) after color gamut mapping that places priority on color gamuts is shown in FIG. 4A and a schematic diagram of color gamuts after color gamut mapping that places priority on hues is shown in FIG. 4B.

In FIGS. 4A and 4B, broken lines denote displayable color gamuts and dot-dot-dash lines denote target color gamuts. FIGS. 4A and 4B show examples in which the target color gamut and displayable color gamut of FIG. 3B overlap partially.

In FIG. 4A, for example, a vertex D of the target color gamut is within the displayable color gamut ABC but a vertex E and a vertex F of the target color gamut is on the outside of the displayable color gamut ABC. It is therefore not possible to reproduce colors in the vicinity of the vertex E and the vertex F.

If it is required to display such colors that cannot be reproduced in this case, color gamut mapping is performed to ensure that those colors are reproduced as close as possible.

With this embodiment, the color gamut mapping places priority on either color gamut or hue.

If the priority is on color gamut, for example, a point H that is close as possible to the vertex E and a point I that is close as possible to the vertex F are obtained from intersections between the triangular shape DEF and the triangular shape ABC. Note that since the vertex D is within the triangular shape ABC, it can be used without modification as a vertex G of the new color gamut.

The triangular shape GHI obtained in this manner is the mapping color gamut obtained when priority is on color gamut, in other words, that obtained when consideration is placed on making the mapping color gamut as extensive as possible.

If the priority is on hue, for example, points K and L where lines from the vertices of the triangular shape DEF towards the white spot intersect the edges of the triangular shape ABC. Note that since the vertex D is within the triangular shape ABC, it can be used without modification as a vertex J of the new color gamut.

The triangular shape JKL obtained in this manner is the mapping color gamut obtained when priority is on hue, in other words, that obtained when consideration is placed on reproducing the hues as accurately as possible. Color has three attributed: brightness, chroma, and hue. Of these three, human eyes are most sensitive to hue. It is therefore possible to use the projector 20 to reproduce colors that are closer to the target color gamut, by obtaining a mapping color gamut that places priority on hue.

The mapping color gamuts of FIGS. 2A and 2B can use the target color gamut without modification.

This embodiment of the invention generates a conversion matrix for the conversion of image information that enables the reproduction of the mapping color gamut as described above, then used the thus-generated conversion matrix to convert the image information.

Functional Blocks

The description now turns to the functional blocks of the image processor section of the projector 20 that comprises this matrix generation means.

Figure 5:
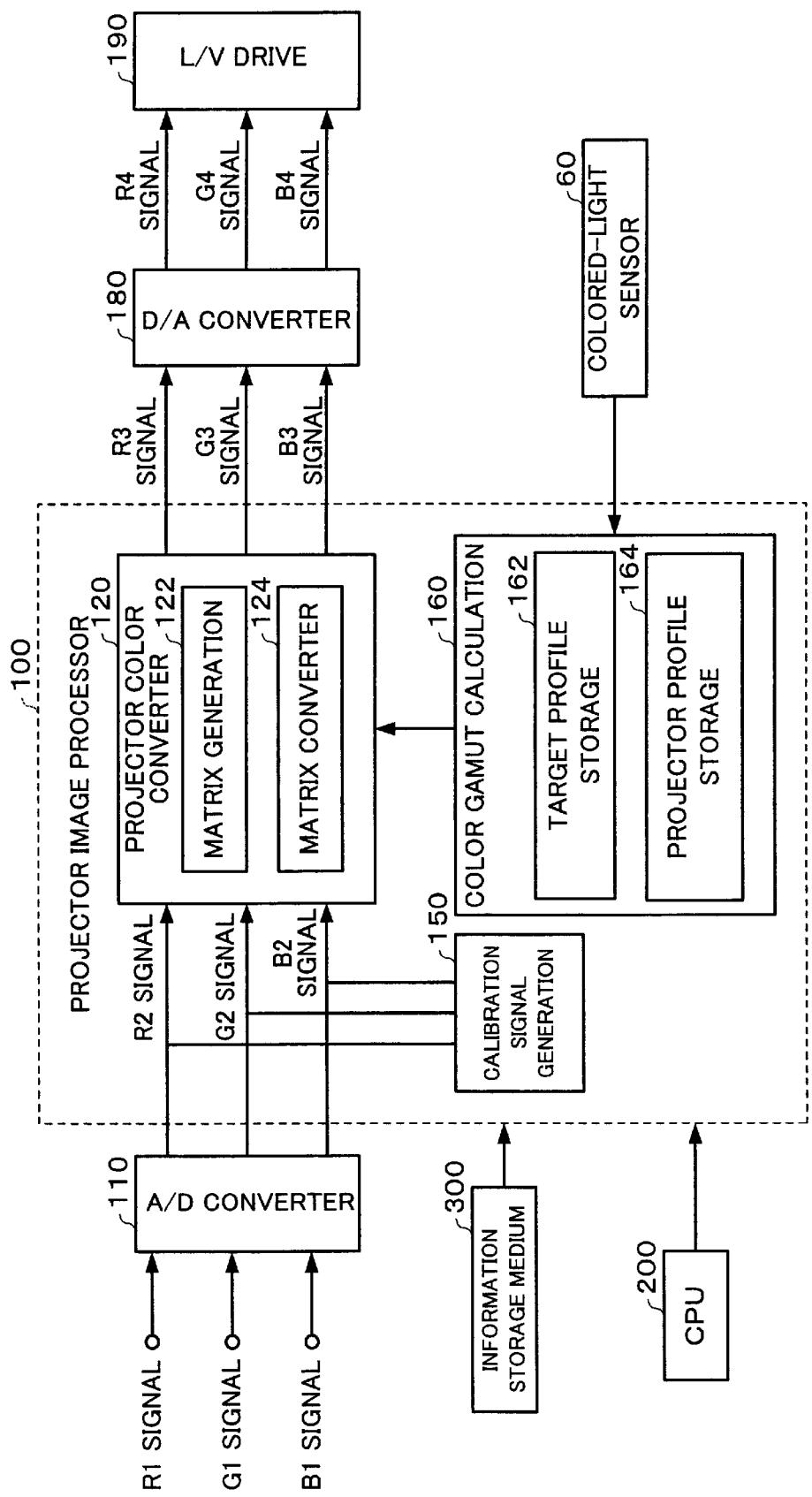
FIG. 5 is a functional block diagram of an image processor section within a projector in accordance with one embodiment of the present invention.

A functional block diagram of an image processor section 100 within the projector 20 in accordance with one embodiment of the invention is shown in FIG. 5.

The projector 20 inputs an R1 signal, a G1 signal, and a B1 signal (which form an RGB signal in analog form, sent from a PC or the like) to an A/D converter section 110, and uses the projector image processor section 100 to perform color conversion on an R2 signal, a G2 signal, and a B2 signal which have been converted into digital form by a CPU 200.

An R3 signal, a G3 signal, and a B3 signal that have been subjected to the color conversion are input to a D/A converter section 180, and an R4 signal, a G4 signal, and a B4 signal that have been converted into analog form are input to a light valve (L/V) drive section 190 that is part of the image display means, to drive liquid crystal light bulbs to display an image.

The projector image processor section 100 comprises a projector color converter section 120, a color gamut calculation section 160, and a calibration signal generation section 150.

The color gamut calculation section 160 comprises a target profile storage section 162 and a projector profile storage section 164.

The calibration signal generation section 150 generates calibration image signals. These calibration image signals are input to the projector color converter section 120 as a digital-format R2 signal, G2 signal, and B2 signal, in a similar manner to the signals output from the A/D converter section 110.

Since the calibration image signals are generated within the projector 20 in this manner, calibration can be done by the projector 20 itself, without having to input calibration image signals to the projector 20 from an external input device such as a PC.

The projector color converter section 120 references a projector profile that is managed by the projector profile storage section 164 to convert the RGB signals (R2 signal, G2 signal, and B2 signal) from the calibration signal generation section 150 into digital RGB signals (R3 signal, G3 signal, and B3 signal) suitable for projector output.

The projector color converter section 120 comprises a matrix generation section 122, which generates a conversion matrix for the conversion of the digital signals (R2 signal, G2 signal, and B2 signal) that are image information, and a matrix converter section 124, which uses the thus-generated conversion matrix to convert the image information.

More specifically, the matrix generation section 122 generates a matrix for use in conversion, enabling reproduction of the mapping color gamut calculated by the color gamut calculation section 160.

The description now turns to the color gamut calculation section 160.

The color gamut calculation section 160 comprises the target profile storage section 162 and the projector profile storage section 164. More specifically, the color gamut calculation section 160 calculates the mapping color gamut that was described with reference to FIGS. 2 to 4, in such a manner as to obtain the preferred colors selected by the user and also the view of image colors that conforms to the visual environment, based on a target profile selected by the user, environmental information from the colored-light sensor 60, and a projector profile.

Note that the "target profile" in this case is a type of input-output characteristic data for the colors that will be the target. More specifically, each target profile is data that defines correspondences between factors such as RGB luminance signals and tristimulus values (X, Y, Z), by way of example. With this embodiment of the invention, each target profile is implemented by a matrix that converts RGB luminance signals into tristimulus values (X, Y, Z). A plurality of profiles corresponding to a plurality of image characteristics that can be selected by the user is provided as target profiles.

A "projector profile" is a type of input-output characteristic data corresponding to the type of the projector 20. More specifically, each projector profile is data that defines correspondences between factors such as RGB luminance signals and tristimulus values (X, Y, Z) obtained in practice when an image is displayed in an ideal environment on the basis of those RGB luminance signals, by way of example. With this embodiment of the invention, each projector profile is implemented by a matrix that converts RGB luminance signals into tristimulus values (X, Y, Z).

Image Processing Flow

The description now turns to the flow of image processing using the above described components, with reference to flowcharts.

Figure 6:
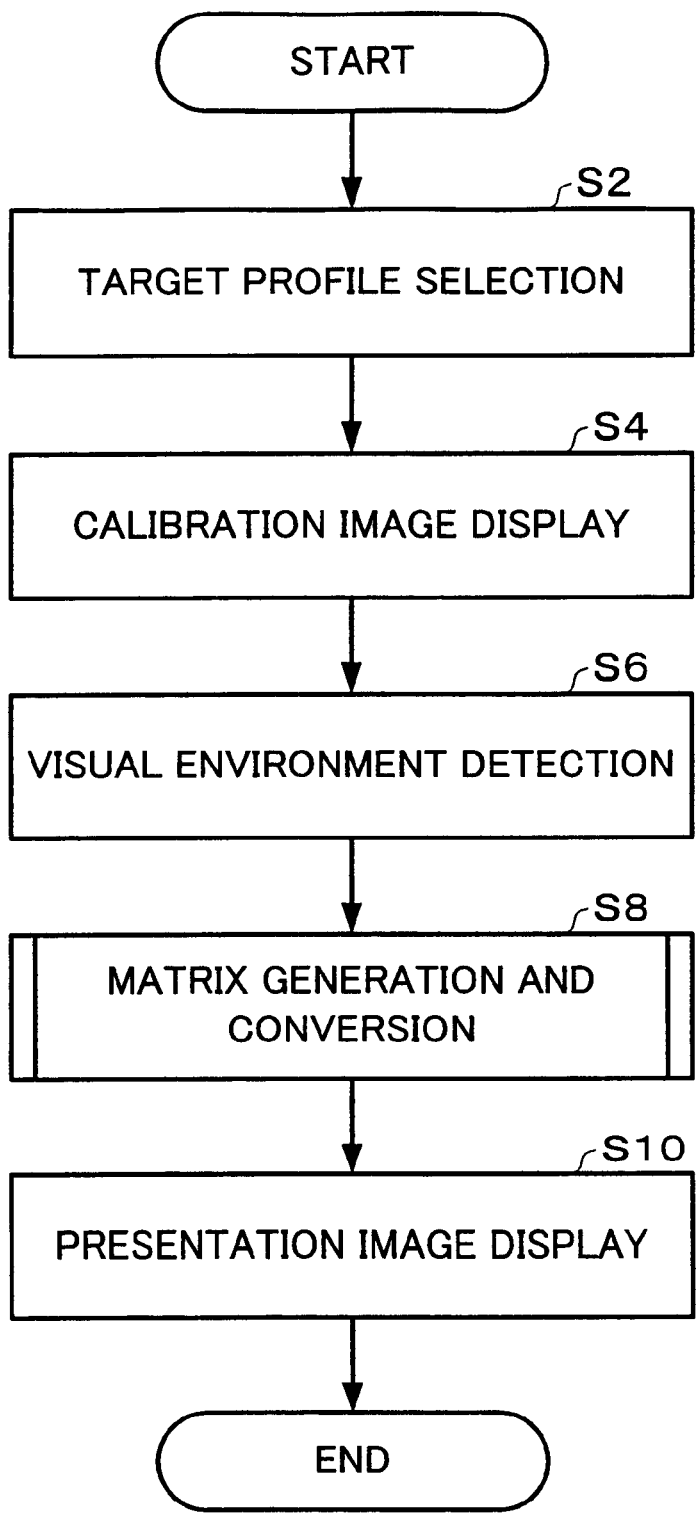
FIG. 6 is a flowchart of the procedure for image processing in accordance with one embodiment of the present invention.

A flowchart of the procedure for image processing in accordance with one embodiment of the invention is shown in FIG. 6.

First of all, before the presentation, the user of the projector 20 selects one image characteristic from a plurality of image characteristics allocated to operating buttons of the projector 20. More specifically, the outer surface of the projector 20 is provided with selection buttons for image characteristics such as NTSC, PAL, or SECAM, and the user is induced to press one of those selection buttons to select one image characteristic.

This selection information is sent to the projector image processor section 100. The projector image processor section 100 turns on the flag of the thus-selected target profile, from a plurality of target profiles of the target profile storage section 162, based on that selection information.

In this manner, the projector image processor section 100 selects the target profile corresponding to the user's selection (step S2).

After the target profile corresponding to the user's selection has been selected, the projector 20 generates calibration signals (R2, G2, B2) from the calibration signal generation section 150.

The calibration signal generation section 150 outputs those calibration signals to the projector color converter section 120.

The projector color converter section 120 uses a default (initial state) conversion matrix to convert the calibration signals and outputs them as digital RGB signals (R3, G3, B3).

The D/A converter section 180 converts the digital RGB signals into analog RGB signals (R4, G4, B4). The L/V drive section 190 drives liquid crystal light valves, based on the analog RGB signals (R4, G4, B4). The projector 20 projects a calibration image to display on the image display region 12 (step S4).

In the state in which the calibration image is displayed on the image display region 12, the colored-light sensor 60 detects tristimulus values for detecting the visual environment (step S6).

In this manner, the visual environment can be detected more appropriately, by using the calibration image in the detection of the visual environment. It is therefore possible to reproduce the image view more appropriately.

The projector color converter section 120 generates a conversion matrix based on the thus-detected visual environment, then uses that conversion matrix to convert the image information (step S8).

This matrix generation and conversion processing (step S8) will now be described more specifically.

A flowchart of the procedure of matrix generation and conversion processing in accordance with one embodiment of the present invention is shown in FIG. 7.

The color gamut calculation section 160 calculates and obtains the target color gamut, based on the target profile selected from the target profile storage section 162. The color gamut calculation section 160 then calculates and obtains the displayable color gamut of the projector 20, based on the projector profile stored in the projector profile storage section 164 and the tristimulus values detected by the colored-light sensor 60 (step S12).

The color gamut calculation section 160 compares the displayable color gamut and the target color gamut obtained by the calculations (step S12).

First of all, if the displayable color gamut matches the target color gamut, in other words, if the situation is as shown in FIG. 2A (step S14), the matrix generation section 122 generates a conversion matrix that enables reproduction of the triangular mapping color gamut denoted by the solid line in FIG. 2A (step S16).

If the displayable color gamut is larger than the target color gamut, in other words, if the situation is as shown in FIG. 2B (step S18), the matrix generation section 122 generates a conversion matrix that enables reproduction of the triangular mapping color gamut denoted by the solid line in FIG. 2B (step S20).

If the displayable color gamut is smaller than the target color gamut, in other words, if the situation is as shown in FIG. 3A, the matrix generation section 122 generates a conversion matrix that enables reproduction of a mapping color gamut that gives priority to either color gamut or hue reproduction, as shown in FIG. 4A or 4B (step S24).

If the situation is not one of the above three patterns (steps S14, S18, and S22), the displayable color gamut has a portion that overlaps the target color gamut and a portion that does not overlap, as shown in FIG. 3B. In that case, the matrix generation section 122 generates a conversion matrix that enables reproduction of a mapping color gamut that gives priority to either color gamut or hue reproduction, as shown in FIG. 4A or 4B (step S26).

Note that all of the conversion matrices generated by the individual matrix generation steps (steps S16, S20, S24, and S26) are different.

The matrix converter section 124 uses the conversion matrix generated by the matrix generation section 122 to perform color conversion (image information conversion) (step S28). More specifically, the matrix converter section 124 uses a 3×3 conversion matrix to convert the digital RGB signals (R2, G2, B2) and outputs them as digital RGB signals (R3, G3, B3).

This can be expressed as an equation, as: (R3, G3, B3)=M(R2, G2, B2), where M denotes the conversion matrix.

The projector 20 uses the D/A converter section 180 to convert the thus-converted digital RGB signals (R3, G3, B3) into analog form, then uses the converted analog RGB signals (R4, G4, B4) to display the actual presentation image (step S10).

Thus this embodiment uses a conversion matrix to convert image information to enable the display of an image that conforms to the image characteristic selected by the user.

This makes it possible to implement an image display system that can display an image that conforms to the user's preferences.

This embodiment also projects and displays an image from consideration of the visual environment, by using the colored-light sensor 60 to detect the visual environment.

It is therefore possible to display an image that is adjusted for the visual environment when the image is displayed, making it possible to absorb differences in display environment and thus display the same image regardless of the environment in which it is employed. This makes it possible to reproduce substantially the same colors within a short time, in a plurality of different locations.

Furthermore, this embodiment makes it possible to convert the image information more rapidly and reduce the amount of dedicated storage required therefor, by using a conversion matrix for the image information conversion, not an LUT.

This embodiment also divides the relationship between displayable color gamut and target color gamut into four patterns during the generation of the conversion matrix, and generates a conversion matrix corresponding to the appropriate pattern.

The relationship between the displayable color gamut and the target color gamut differs with the environment in which the projector 20 is used and the image characteristic selected by the user. For that reason, it is necessary to generate a conversion matrix that is appropriate for the relationship between the displayable color gamut and the target color gamut.

With this embodiment of the invention, an appropriate conversion matrix can be generated by generating a conversion matrix corresponding to any of four assumed patterns.

Note that in the patterns shown in FIGS. 2A and 2B, it is possible that the target color gamut can be used substantially unchanged as the mapping color gamut, enabling faster conversion matrix generation than in the cases shown in FIGS. 3A and 3B in which color gamut mapping is necessary.

In addition, it is possible to reproduce an image more appropriately in the cases shown in FIGS. 3A and 3B in which color gamut mapping is necessary, by using a conversion matrix that emphases either hue reproducibility or color gamut reproducibility, in comparison with the use of a conversion matrix that emphases brightness or chroma.

Hardware

Note that the hardware listed below could be applied as the portions described above.

For example, the A/D converter section 110 could be implemented by an A/D converter or the like, the D/A converter section 180 by a D/A converter or the like, the L/V drive section 190 by a liquid crystal light valve driver or the like, the projector color converter section 120 by image processing circuitry or an ASIC, and the color gamut calculation section 160 by a CPU and RAM, by way of example. Note that these portions could be implemented in a hardware fashion by circuitry, or they could be implemented in a software fashion by drivers and/or programs.

In addition, the functions of the components shown in FIG. 5 could be implemented by reading out a program from an information storage medium 300. The information storage medium 300 could be a CD-ROM, DVD-ROM, ROM, RAM, or HDD, by way of example, and the method of reading the program therefrom could be a direct method or an indirect method.

Instead of the information storage medium 300, it is possible to implement the above described functions by downloading a program that implements those functions over a transfer path from a host device or the like. In other words, a program for implementing these functions could be embodied over carrier waves.

The hardware described below could be employed for the colored-light sensor 60.

For example, components such as a color filter and photodiode that selectively pass each stimulus value, an A/D converter that converts an analog signal from that photodiode into a digital signal, and an op-amp that amplifies that digital signal could be employed therefor.

Note the present invention has been described above by way of embodiments thereof, but the application of the present invention is not limited to the above embodiments.

Modifications

For example, an image characteristic such as RGB or sRGB image type could be employed as the target profile, instead of the NTSC or similar image display method.

Similarly, the visual environment detection means could be imaging means such as a CCD camera or a CMOS camera, instead of the colored-light sensor 60.

Note that the abovementioned screen 10 could be of a reflective type or a transmissive type.

Furthermore, the conversion matrix that was described above related to a single matrix, but the color conversion could also be done with a combination of a plurality of matrices. For example, the color conversion could be done with a combination of an inverse-conversion matrix corresponding to an output device and an environment compensation matrix that reflects environmental information.

The present invention can also be applied to presentations in which images are displayed by a display means other than a projection-type image display device such as a projector. Apart from a liquid crystal projector, this display means could be a display device such as a cathode ray tube (CRT), a plasma display panel (PDP), a field emission device (FED), and electro-luminescence (EL) device, or a direct-view type of liquid crystal display device, or a projector using a digital micromirror device (DMD), by way of example. Note the DMD is a tradename registered by Texas Instruments Inc., of the US. In addition, the projector is not limited to a front-projection type; it could equally well be of a rear-projection type.

In addition to presentations, this invention is also effective when used in the display of images, such as those at meetings, during medical treatment, in the design and fashion fields, business activities, commercials, and education, as well as general-purpose images such as those in movies, TV, videos, and games.

Note that the functions of the above-described projector image processor section 100 of the projector 20 could be implemented by a simple image display device (such as the projector 20 itself) or by distribution between a plurality of processing devices (such as distributed processing between the projector 20 and a PC).

What is claimed is:

1. An image display system which converts image information used for displaying an image and displays the image, based on environmental information obtained by a visual environment detection means which detects visual environment in a display area in which the image is displayed, the image display system comprising:

matrix generation means which generates a conversion matrix used for conversion, based on the environmental information and an image characteristic selected by a user, so as to display the image that is suited to the visual environment and the image characteristic;

matrix conversion means which converts the image information, based on the generated conversion matrix;

image display means which displays the image based on the converted image information; and a color gamut calculation means which calculates a target color gamut based on the image characteristic and also calculates a displayable color gamut that is displayable by the image display means in the visual environment, based on the environmental information, the image characteristic is based on at least one of an image display method and an image classification, and the matrix generation means generates different conversion matrices according to a relationship between the displayable color gamut and the target color gamut, the relationship including a case where the displayable color gamut is larger than the target color gamut, a case where the displayable color gamut is smaller than the target color gamut, a case where the displayable color gamut matches the target color gamut, and a case where the displayable color gamut has a portion that overlaps the target color gamut and a portion that does not overlap the target color gamut.

2. The image display system as defined by claim 1, the matrix generation means generates the conversion matrix that emphases either hue reproducibility or color gamut reproducibility, when the displayable color gamut is smaller than the target color gamut or when the displayable color gamut has a portion that overlaps the target color gamut and a portion that does not overlap the target color gamut.

3. The image display system as defined by claim 2, further comprising a projection-type display device having:

the color gamut calculation means;

the matrix generation means;

the matrix conversion means;

the image display means; and calibration image generation means which generates a calibration image, the image display means projects the generated calibration image for display on the display area, and the visual environment detection means detects the visual environment in the display area in which the calibration image is displayed.

4. An image display system which converts image information used for displaying an image and displays the image, based on environmental information obtained by a visual environment detection section which detects visual environment in a display area in which the image is displayed, the image display system comprising:

a matrix generation section which generates a conversion matrix used for conversion, based on the environmental information and an image characteristic selected by a user, so as to display the image that is suited to the visual environment and the image characteristic;

a matrix conversion section which converts the image information, based on the generated conversion matrix;

an image display section which displays the image based on the converted image information; and a color gamut calculation means which calculates a target color gamut based on the image characteristic and also calculates a displayable color gamut that is displayable by the image display means in the visual environment, based on the environmental information, the image characteristic is based on at least one of an image display method and an image classification, and the matrix generation means generates different conversion matrices according to a relationship between the displayable color gamut and the target color gamut, the relationship including a case where the displayable color gamut is larger than the target color gamut, a case where the displayable color gamut is smaller than the target color gamut, a case where the displayable color gamut matches the target color gamut, and a case where the displayable color gamut has a portion that overlaps the target color gamut and a portion that does not overlap the target color gamut.

5. An image processing method which converts image information used for displaying an image, based on environmental information obtained by a visual environment detection means which detects visual environment in a display area in which the image is displayed, the image processing method comprising:

a matrix generation step of generating a conversion matrix used for conversion, based on the environmental information and an image characteristic selected by a user, so as to display the image that is suited to the visual environment and the image characteristic;

a matrix conversion step of converting the image information, based on the generated conversion matrix; the image characteristic is based on at least one of an image display method and an image classification method, the matrix generation step includes a step of calculating a target color gamut based on the image characteristic and also calculating a displayable color gamut that is displayable by the image display means in the visual environment, based on the environmental information, and the matrix generation step generates different conversion matrices according to a relationship between the displayable color gamut and the target color gamut, the relationship including a case where the displayable color gamut is larger than the target color gamut, a case where the displayable color gamut is smaller than the target color gamut, a case where the displayable color gamut matches the target color gamut, and a case where the displayable color gamut has a portion that overlaps the target color gamut and a portion that does not overlap the target color gamut.

6. The image processing method as defined by claim 5, the matrix generation step generates the conversion matrix that emphases either hue reproducibility or color gamut reproducibility, when the displayable color gamut is smaller than the target color gamut or when the displayable color gamut has a portion that overlaps the target color gamut and a portion that does not overlap the target color gamut.

7. The image processing method as defined by claim 6, further comprising the steps of:

generating a calibration image, prior to compensation of the image information;

displaying the generated calibration image in the display area; and detecting the visual environment within the display area in which the calibration image is displayed, and generating the environmental information.

8. A computer-readable program for converting image information used for displaying an image, based on environmental information obtained by a visual environment detection means which detects visual environment in a display area in which the image is displayed, the program causing a computer to function as:

matrix generation means which generates a conversion matrix used for conversion, based on the environmental information and an image characteristic selected by a user, so as to display the image that is suited to the visual environment and the image characteristic;

matrix conversion means which converts the image information, based on the generated conversion matrix; and a color gamut calculation means which calculates a target color gamut based on the image characteristic and also calculates a displayable color gamut that is displayable by the image display means in the visual environment, based on the environmental information, the image characteristic is based on at least one of any image display method and an image classification, and the matrix generation means generates different conversion matrices according to a relationship between the displayable color gamut and the target color gamut, the relationship including a case where the displayable color gamut is larger than the target color gamut, a case where the displayable color gamut is smaller than the target color gamut, a case where the displayable color gamut matches the target color gamut, and a case where the displayable color gamut has a portion that overlaps the target color gamut and a portion that does not overlap the target color gamut.

9. The program as defined by claim 8, the matrix generation means generates the conversion matrix that emphases either hue reproducibility or color gamut reproducibility, when the displayable color gamut is smaller than the target color gamut or when the displayable color gamut has a portion that overlaps the target color gamut and a portion that does not overlap the target color gamut.

* * * * *